US010273017B2

(12) United States Patent
Wright

(10) Patent No.: US 10,273,017 B2
(45) Date of Patent: Apr. 30, 2019

(54) SYSTEM AND METHOD FOR PROTECTING THE STRUCTURAL INTEGRITY OF AN ENGINE STRUT

(71) Applicant: The Boeing Company, Chicago, IL (US)

(72) Inventor: Robert S. Wright, Seattle, WA (US)

(73) Assignee: The Boeing Company, Chicago, IL (US)

( * ) Notice: Subject to any disclaimer, the term of this patent is extended or adjusted under 35 U.S.C. 154(b) by 501 days.

(21) Appl. No.: 15/070,796

(22) Filed: Mar. 15, 2016

(65) Prior Publication Data
US 2017/0267365 A1 Sep. 21, 2017

(51) Int. Cl.
*B64D 31/06* (2006.01)
*B64D 45/00* (2006.01)
(Continued)

(52) U.S. Cl.
CPC ............ *B64D 31/06* (2013.01); *B64D 45/00* (2013.01); *F01D 17/085* (2013.01); *F01D 21/12* (2013.01); *F01D 25/28* (2013.01); *F02C 7/20* (2013.01); *F02C 9/16* (2013.01); *B64D 2045/0085* (2013.01); *F02C 7/25* (2013.01); *F05D 2240/90* (2013.01); *F05D 2260/80* (2013.01);
(Continued)

(58) Field of Classification Search
CPC .................... B64D 31/06; B64D 45/00; B64D 2045/0085; F02C 9/16; F02C 7/20; F01D 21/12; F01D 17/085; F01D 25/28; F05D 2270/112; F05D 2240/90; F05D 2270/3032; F05D 2270/051; F05D 2260/80; F05D 2270/335; F05D 2270/44
See application file for complete search history.

(56) References Cited

U.S. PATENT DOCUMENTS 3,818,469 A * 6/1974 Lindberg ............. A62C 99/009
374/159
2011/0120075 A1 5/2011 Diaz
(Continued)

FOREIGN PATENT DOCUMENTS

| RU | 2499240 | 4/2005 |
|---|---|---|
| RU | 2249714 | 8/2005 |
| RU | 2258923 | 11/2013 |

OTHER PUBLICATIONS

Russian Patent Office, Office Action for Appl. No. 2016150951/11(081714), dated Apr. 17, 2018.
EPO, EESR for Appl. No. 17158658.9, dated Aug. 9, 2017.

*Primary Examiner* — Dale W Hilgendorf

(57) ABSTRACT

A system for protecting the structural integrity of an engine strut may include a first monitor, a second monitor, and a controller communicatively coupled to the first monitor and the second monitor. The first monitor may be mounted proximate an engine strut coupling a turbine engine to an airframe of an aircraft. The second monitor may be mounted proximate the first monitor. The first monitor and the second monitor may each be configured to fail upon reaching a triggering temperature indicative of a burn-through in an engine case during operation of the turbine engine. The controller may be configured to automatically reduce an operating parameter of the turbine engine upon a failure of both the first monitor and the second monitor.

16 Claims, 12 Drawing Sheets

(51) Int. Cl.
*F02C 7/20* (2006.01)
*F02C 9/16* (2006.01)
*F01D 17/08* (2006.01)
*F01D 21/12* (2006.01)
*F01D 25/28* (2006.01)
*F02C 7/25* (2006.01)

(52) U.S. Cl.
CPC .. *F05D 2270/051* (2013.01); *F05D 2270/112* (2013.01); *F05D 2270/3032* (2013.01); *F05D 2270/335* (2013.01); *F05D 2270/44* (2013.01)

(56) References Cited

U.S. PATENT DOCUMENTS

| | | | |
|---|---|---|---|
| 2014/0320292 A1 | 10/2014 | Rennie et al. | |
| 2015/0066430 A1* | 3/2015 | Priori et al. | F05D 2260/80 702/179 |
| 2016/0214726 A1* | 7/2016 | Giamati | B64D 45/00 |

* cited by examiner

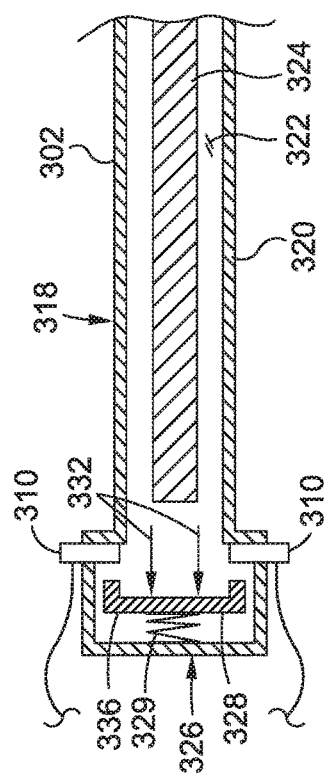
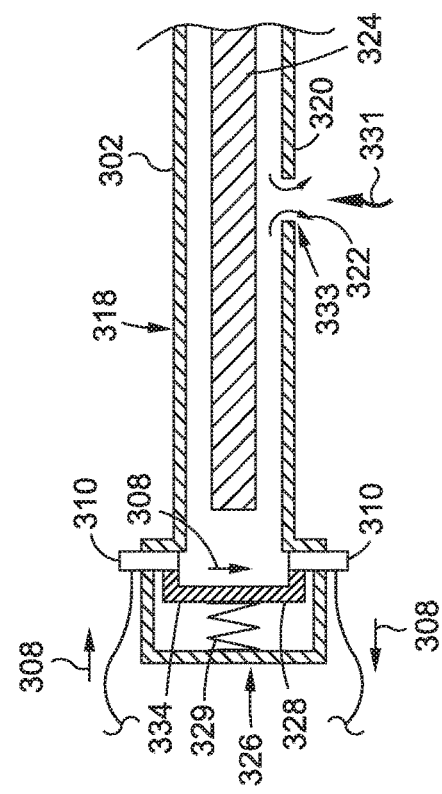

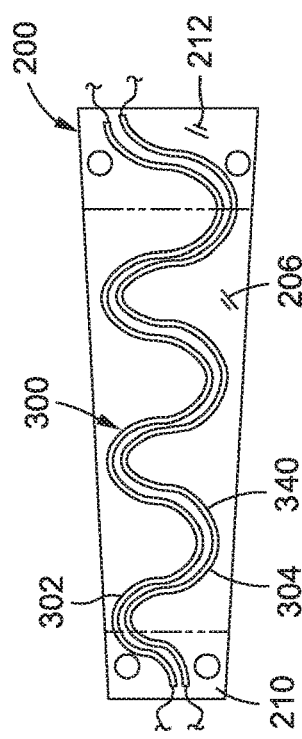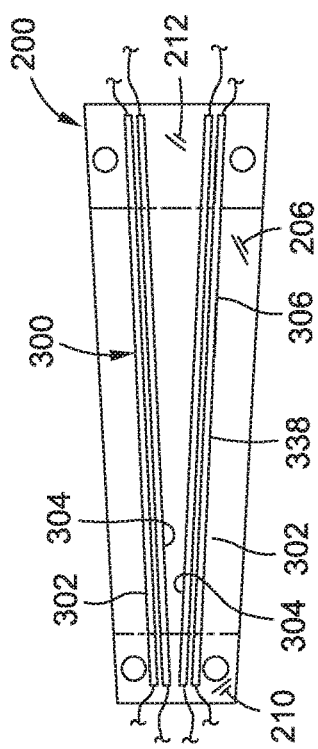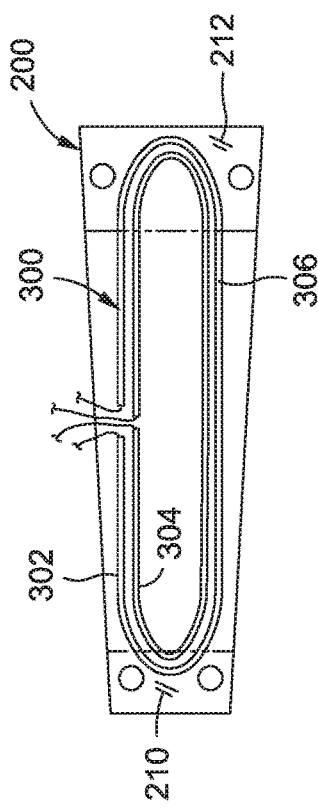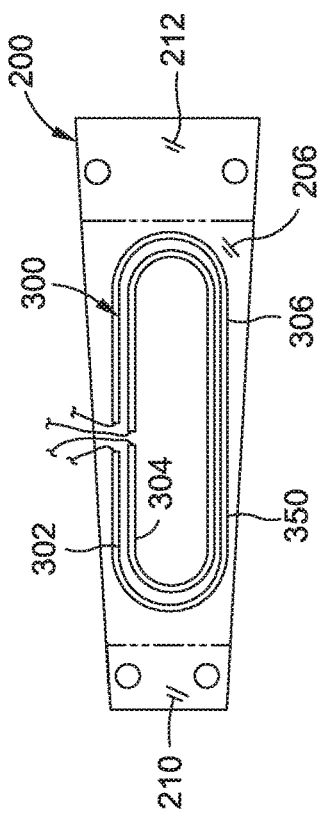

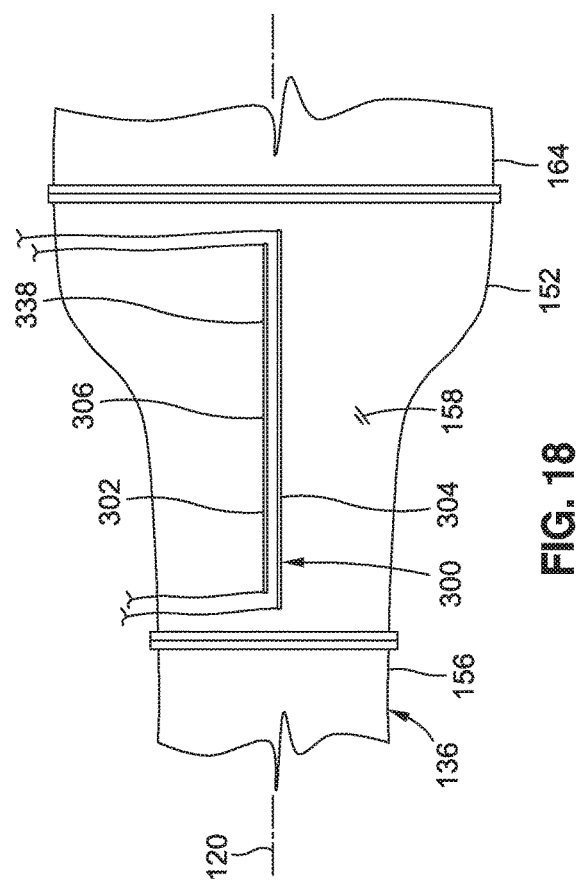
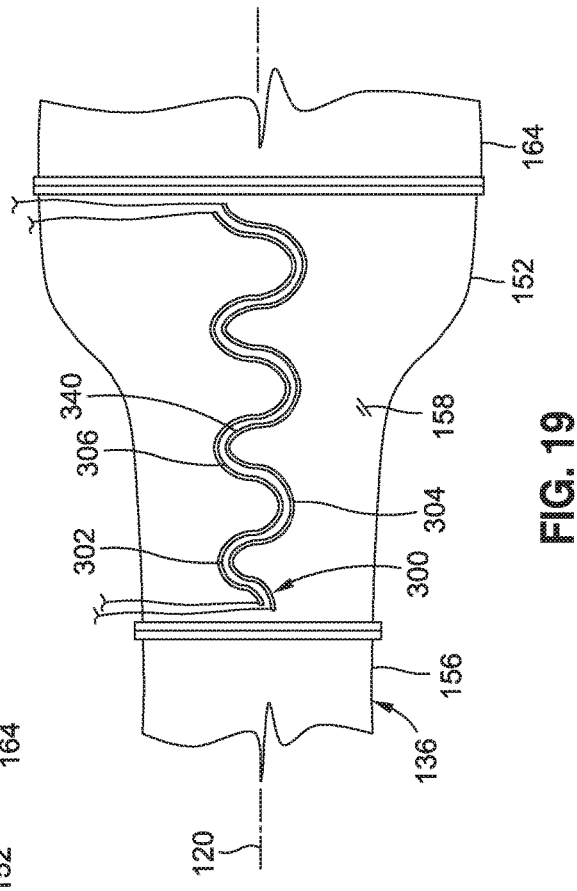
FIG. 18
FIG. 19

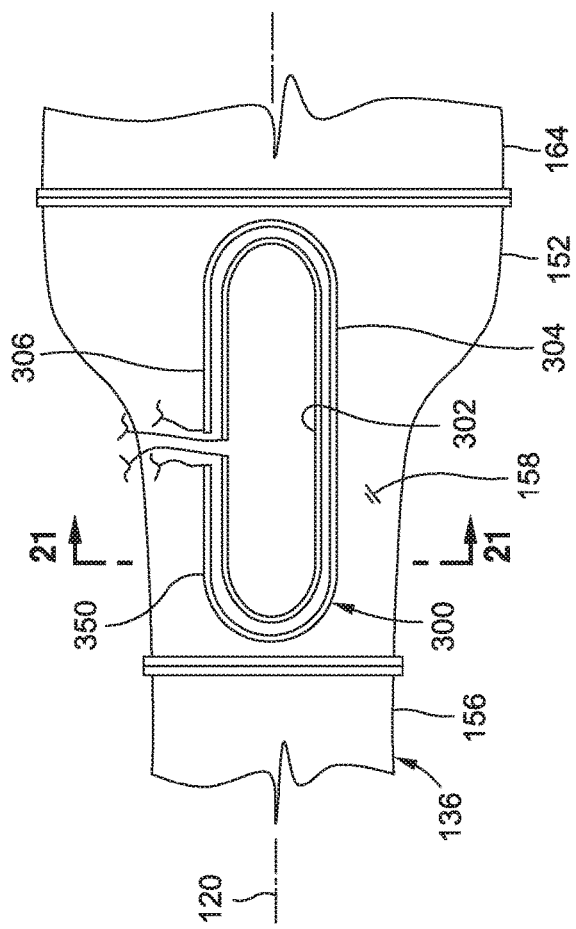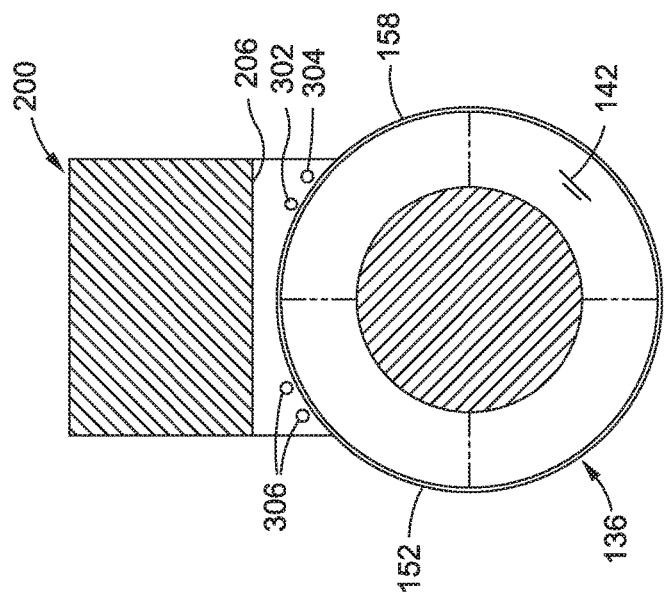

SYSTEM AND METHOD FOR PROTECTING THE STRUCTURAL INTEGRITY OF AN ENGINE STRUT

FIELD

The present disclosure relates generally to aircraft structures and, more particularly, to a system and method for protecting the structural integrity of an engine strut.

BACKGROUND

Gas turbine engines of an aircraft typically include an arrangement of compressors, a combustor, and turbines. The compressors receive air from an air intake and pressurize the air for delivery to the combustor. In the combustor, fuel is injected into the air and ignited resulting in a superheated, high-pressure air-fuel mixture with temperatures in the thousands of degrees. The superheated gas passes from the combustor into the turbines which expand the combustion gases to produce engine thrust.

Gas turbine engines of commercial aircraft are typically mounted to the wings or fuselage by means of an engine strut. For example, an engine strut may extend from an underside of a wing and may be coupled to an engine core of the turbine engine. The engine strut must be capable of transferring high thrust loads to the wing while supporting the relatively large mass of the engine under high g-loads and high aerodynamic loads. In addition, the engine strut must retain its load-carrying capability in the event of a burn-through of the combustor case which may be described as a hole formed in the combustor case by a jet of superheated gas which may emanate from the combustor.

Current engine struts are designed to retain their structural integrity in the event of a burn-through. However, the trend for turbine engine design is increasingly higher pressures and higher temperatures. Such increased pressures and temperatures of future engine designs present the risk of a burn-through that may exceed the capability of the engine strut. One possible solution is to increase the temperature-resisting capability of the engine strut by incorporating high-temperature materials. Unfortunately, such an approach may significantly add to the cost and structural mass of the engine strut.

As can be seen, there exists a need in the art for a system and method for protecting the structural integrity of an engine strut which is cost-effective and lightweight.

SUMMARY

The above-noted needs associated with engine struts are specifically addressed and alleviated by the present disclosure which provides a system for protecting the structural integrity of an engine strut. The system may include a first monitor, a second monitor, and a controller communicatively coupled to the first monitor and the second monitor. The first monitor may be mounted proximate an engine strut coupling a turbine engine to an airframe of an aircraft. The second monitor may be mounted proximate the first monitor. The first monitor and the second monitor may each be configured to fail upon reaching a triggering temperature indicative of a burn-through in an engine case. The controller may be configured to automatically reduce an operating parameter of the turbine engine upon a failure of both the first monitor and the second monitor.

In a further embodiment, the first monitor may be mounted proximate an engine strut coupling a turbine engine to a wing of an aircraft. The first monitor and the second monitor may each be configured to fail upon reaching a triggering temperature indicative of a burn-through in a combustor case during operation of the turbine engine. The controller may automatically reduce an engine thrust of the turbine engine upon a failure of both the first monitor and the second monitor.

Also disclosed is a method for protecting the structural integrity of an engine strut. The method may include operating a turbine engine coupled by the engine strut to an airframe of an aircraft. In addition, the method may include increasing a temperature of at least one of a first monitor and a second monitor mounted proximate the engine strut and communicatively coupled to a controller. The method may also include failing at least one of the first monitor and the second monitor upon reaching a triggering temperature. Furthermore, the method may include determining, using the controller, whether at least one of the first monitor and the second monitor has failed, and reducing, if both the first monitor and the second monitor have failed, an operating parameter of the turbine engine using the controller.

The features, functions and advantages that have been discussed can be achieved independently in various embodiments of the present disclosure or may be combined in yet other embodiments, further details of which can be seen with reference to the following description and drawings below.

BRIEF DESCRIPTION OF THE DRAWINGS

These and other features of the present disclosure will become more apparent upon reference to the drawings wherein like numbers refer to like parts throughout and wherein:

FIG. 11 is a magnified view of a further example of a pressure switch in a normally open position due to internal pressure of the gas in the housing;

FIG. 12 is a magnified view of the pressure switch of FIG. 11 in a closed position as a result of loss of internal pressure due to the escape of gas through an opening burned into the housing by a jet of hot gas locally heating the housing to the triggering temperature;

FIG. 13 is a plan view of a further example of a pair of the first and second monitors each having a straight shape and forming an electrical continuity circuit with the controller;

FIG. 14 is an example of the first monitor and the second monitor configured in a serpentine shape;

FIG. 15 is an example of the first monitor and the second monitor each configured as a loop;

FIG. 16 is an example of the first monitor and the second monitor each configured as a loop overlapping a forward engine mount and an aft engine mount of the engine strut;

FIG. 18 is a plan view of the upper exterior surface of the engine core taken along line 16 of FIG. 17 and illustrating an example of parallel first and second monitors each having a straight shape and mounted to an exterior of the combustor case;

FIG. 19 is a plan view of a further example of the first monitor and the second monitor configured in a serpentine shape and mounted to the exterior of the combustor case;

FIG. 20 is a plan view of an additional example of the first monitor and the second monitor configured as a loop and mounted to the exterior of the combustor case;

FIG. 21 is a sectional view of the engine core and engine strut taken along line 19 of FIG. 20 and illustrating the positioning of the first monitor and second monitor directly below the underside of the engine strut;

DETAILED DESCRIPTION

Figure 1:
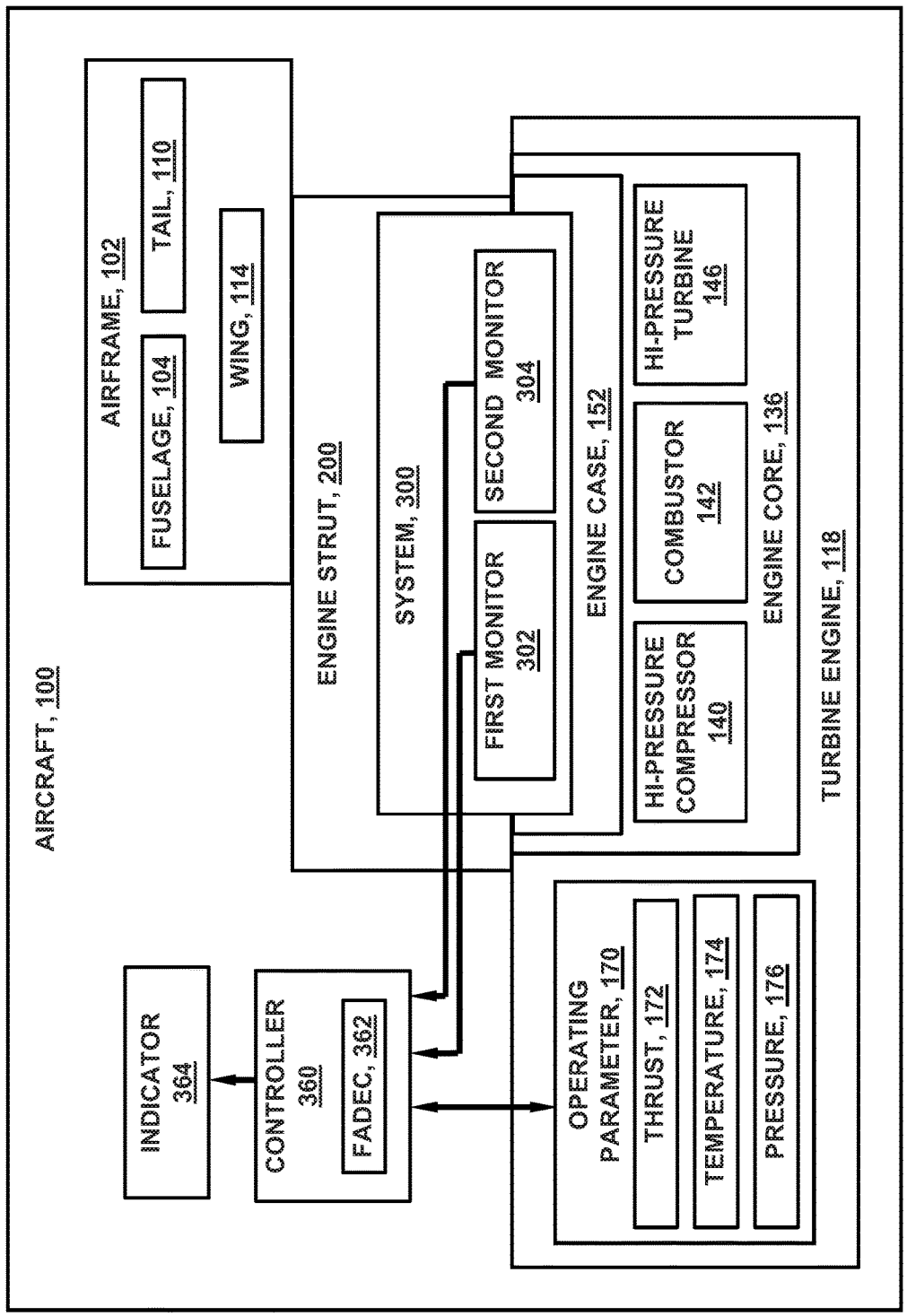
FIG. 1 is a block diagram of an example of a system for protecting the structural integrity of an engine strut in the event of a burn-through of the engine case, and including a first monitor and a second monitor mounted proximate a turbine engine and communicatively coupled to a controller configured to reduce an engine operating parameter upon a failure of both the first monitor and the second monitor due to heating above a triggering temperature.

Referring now to the drawings wherein the showings are for purposes of illustrating various embodiments of the present disclosure, shown in FIG. 1 is an example of a system 300 for protecting the structural integrity of an engine strut 200 such as in the event of a burn-through of an engine case 152 of a gas turbine engine 118. The engine strut 200 couples the turbine engine 118 to an airframe 102 of an aircraft 100. For example, the engine strut 200 may couple a turbine engine 118 to a wing 114, a fuselage 104, or a vertical tail 110 of the aircraft 100. However, the engine strut 200 may be configured to couple a turbine engine 118 to an airframe 102 at any one of a variety of locations on an aircraft 100.

In an embodiment, the system 300 includes two or more monitors 302, 304 (FIG. 1) for sensing the occurrence of a high-temperature event associated with the turbine engine 118. The high-temperature event may be a burn-through (not shown) in the engine case 152 (FIG. 1) which may be described as a hole formed or melted through the engine case 152 by a jet of hot gas (e.g., a jet of superheated air/fuel mixture). In one example, a burn-through may occur in the combustor case 158 of the engine core 136 due to the high temperatures and high pressures inside the combustor 142. The hole may extend from an interior of the engine case 152 to an exterior of the engine case 152. However a burn-through may occur in other regions of the engine case 152 such as in the high-pressure compressor case 156 (FIG. 5) located upstream of the combustor 142, and/or in the high-pressure turbine case 160 located downstream of the combustor 142.

In one example, the system 300 may include a first monitor 302 and a second monitor 304 mounted proximate the turbine engine 118. The first monitor 302 and the second monitor 304 are each configured to fail upon reaching a triggering temperature indicative of a burn-through in the engine case 152 (e.g., the combustor case 158) during operation of the turbine engine 118. The triggering temperature is higher than the normal temperature of the engine case 152 and/or the engine strut 200 at the location of the first monitor 302 and the second monitor 304 during normal (e.g., non-burn-through) operation of the turbine engine 118. As described in greater detail below, the first monitor 302 and the second monitor 304 are located in a high-risk zone of the engine case 152 such as proximate the combustor case 158 (FIG. 5) in the region or quadrant facing the airframe 102 and/or facing the engine strut 200. The first monitor 302 and the second monitor 304 may each function as a monitoring circuit providing a continuous indication of the structural health of the engine case 152. In this regard, the first monitor 302 and the second monitor 304 may monitor for excessive localized heating of the engine case 152 and/or the engine strut 200 beyond the normal heating that occurs during nominal (e.g., non-burn-through) operation of the engine.

The system 300 includes a controller 360 communicatively coupled to the first monitor 302 and the second monitor 304. The controller 360 may determine whether the first monitor 302 and the second monitor 304 have failed. If both the first monitor 302 and the second monitor 304 have failed, the controller 360 automatically reduces an operating parameter 170 of the turbine engine 118. For example, the controller 360 may automatically reduce the engine thrust 172, the combustor temperature 174, and/or the combustor pressure 176 in a manner resulting in a reduction in the temperature of the engine strut 200 as a means to preserve the structural integrity of the engine strut 200. By "automatic" or "automatically," it is meant in the context of the present application that the controller 360 may reduce the operating parameter 170 of the turbine engine 118 without manual input from the flight crew or other operator.

The system 300 may allow for manual override of the controller 360 for fine-tuning the operating parameter 170 to a setting different than the setting performed by the controller 360. In other examples, the controller 360 may be an electronic engine control system such as a full authority digital engine controller 360 (FADEC 362—FIG. 1) which may disallow manual override by the flight crew. However, the controller 360 may reduce an operating parameter 170 (e.g., the thrust setting) of the turbine engine 118 only to the extent that a limiting temperature is reached that can be handled by the engine strut 200. The system 300 may be configured to provide the flight crew with the capability for full shutdown of the turbine engine 118 if necessary. The system 300 advantageously avoids complex temperature detection logic that would otherwise require temperature monitoring and continuous temperature data input from a variety of different locations on the turbine engine 118 (e.g., the engine case 152) and the airframe 102 including the engine strut 200.

Figure 2:
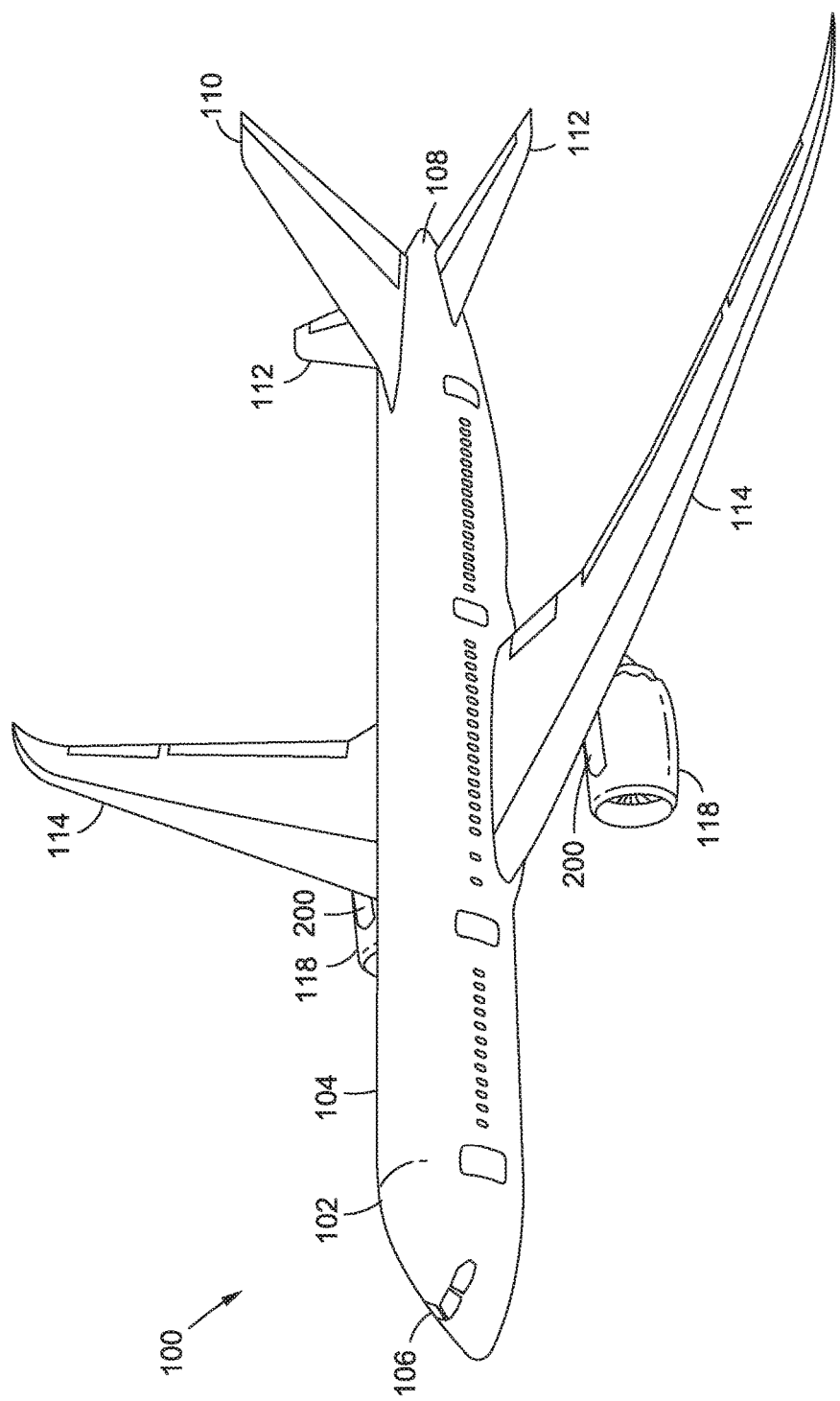
FIG. 2 is a perspective view of an example of an aircraft including a pair of turbine engines each coupled to a wing by an engine strut incorporating the presently-disclosed system.

FIG. 2 is a perspective view of an aircraft 100 that may incorporate one or more examples of the system 300 (FIG. 1) disclosed herein. The aircraft 100 includes a fuselage 104 and a pair of wings 114 extending outwardly from the fuselage 104. The aircraft 100 may include a pair of turbine engines 118 each coupled to a wing 114 by an engine strut 200. The aircraft 100 may include a flight deck 106 at a forward end of the fuselage 104, and an empennage 108 at the aft end of the fuselage 104. The empennage 108 may include one or more horizontal tails 112 and a vertical tail 110. Although the presently-disclosed system 300 and method is described in the context of a tube-and-wing aircraft 100 as shown in FIG. 2, the system 300 and method may be implemented on any type of aircraft having one or more turbine engines 118, including fixed-wing aircraft and rotary-wing aircraft. In addition, the presently-disclosed system 300 and method may be implemented on any type of civil, commercial, and/or military aircraft, without limitation.

Figure 3:
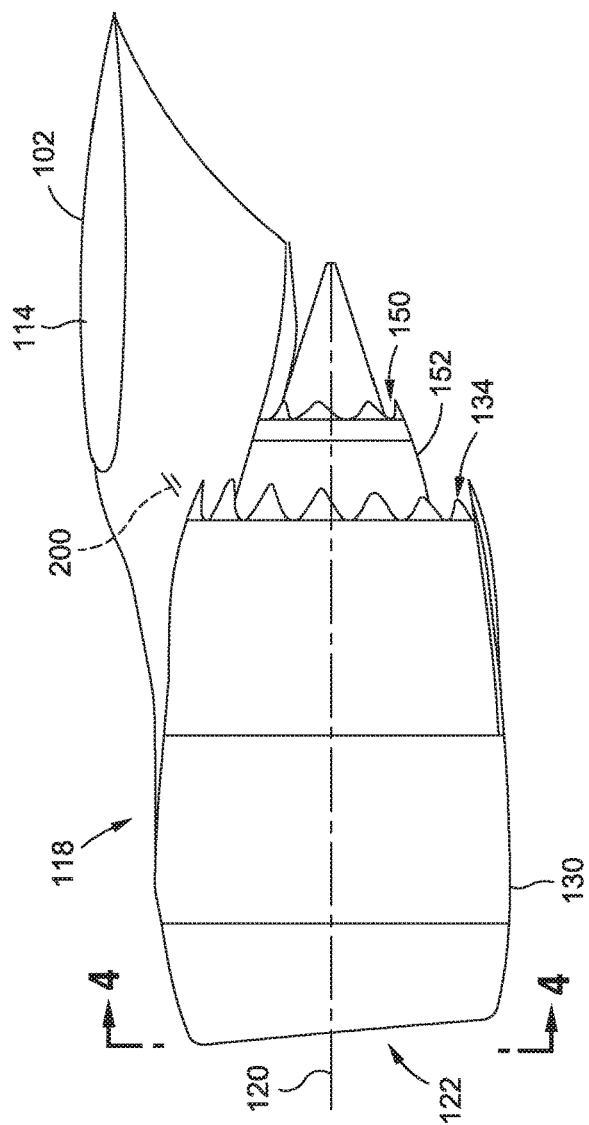
FIG. 3 is a side view of an example of a turbine engine mounted to a wing using an engine strut.
Figure 4:
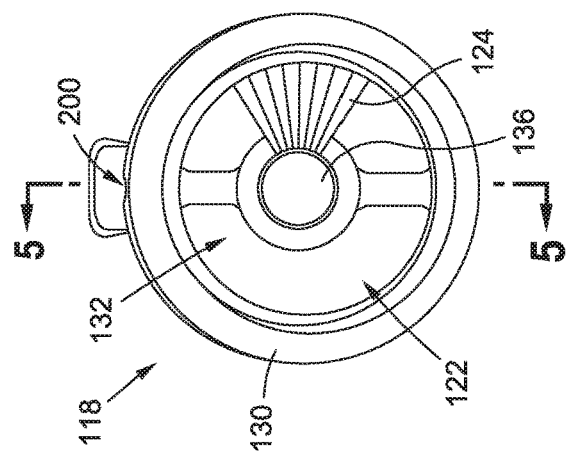
FIG. 4 is a front view of the turbine engine of FIG. 3.

FIG. 3 is a side view of an example of a high-bypass turbofan configuration of a turbine engine 118 mounted to a wing 114 using an engine strut 200. FIG. 4 is a front view of the turbofan engine of FIG. 3. In the example shown, the engine strut 200 positions the turbine engine 118 below and generally forward of the wing 114. Atmospheric air enters the air intake defined by the fan cowl 130. A portion of the intake air is compressed and injected with fuel and ignited causing expansion prior to discharge from the core nozzle 150. The remaining portion of the intake air is accelerated rearward by a fan rotor 124 (FIG. 5) prior to discharge from the fan nozzle 134. The combined discharge from the core nozzle 150 and the fan nozzle 134 forms the engine thrust 172 (FIG. 1).

Figure 5:
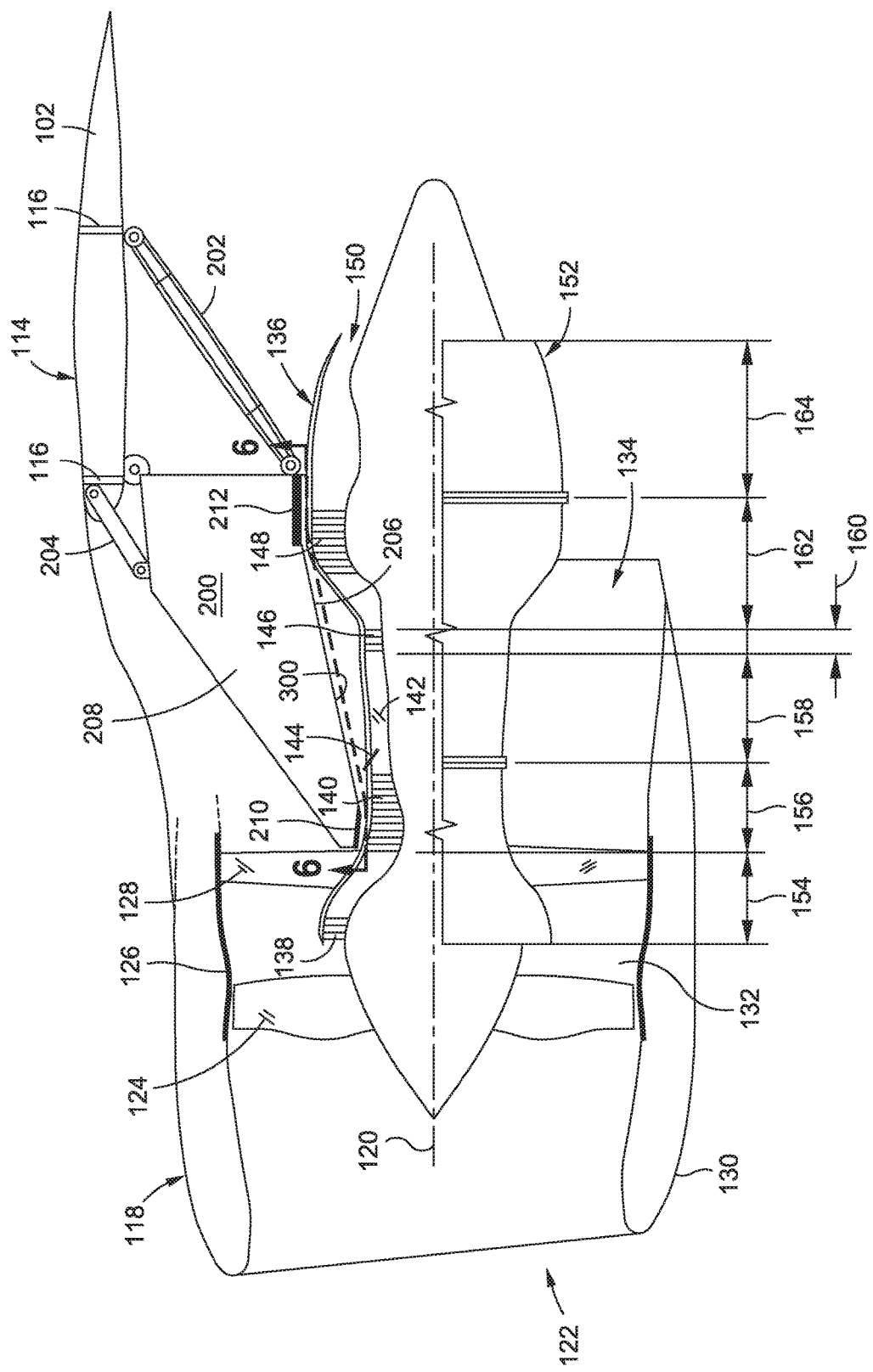
FIG. 5 is a sectional view of the turbine engine taken along line 5 of FIG. 4 and illustrating the engine strut attached to an engine case of the turbine engine.

FIG. 5 is a sectional view of a turbine engine 118 showing an example of an attachment configuration for attaching the turbine engine 118 to an aircraft wing 114 using an engine strut 200. The engine strut 200 may include a main portion 208 which may be described as a primary load-carrying structure of the engine strut 200. The attachment configuration may include one or more diagonal braces 202 each extending between a lower aft end of the engine strut 200 and a wing fitting (not shown) that may be structurally coupled to a wing spar 116. In addition, the attachment configuration may include one or more upper links 204 extending between a top of the engine strut 200 and a wing fitting (not shown) that may also be structurally coupled to a wing spar 116.

The main portion 208 of the engine strut 200 may include one or more engine mounts defined as locations where the turbine engine 118 is attached to the engine strut 200. The engine mounts may include one or more forward engine mounts 210 and one or more aft engine mounts 212. In the example shown, the forward engine mounts 210 and the aft engine mounts 212 may each be mechanically attached to the engine case 152 of the engine core 136.

As mentioned above with regard to FIGS. 3-4, the engine core 136 may be surrounded by a fan cowl 130 and a fan nozzle 134. Atmospheric air may be drawn into the intake 122 defined by the fan cowl 130. The fan cowl 130 may circumscribe the fan rotor 124 which may rotate within a fan case 126. The fan cowl 130 and the fan case 126 may be supported on the engine core 136 by radially projecting vanes 128. A portion of the intake air may be drawn into the engine core 136 and compressed by a low-pressure compressor 138 and a high-pressure compressor 140 respectively housed within a low-pressure compressor case 154 and a high-pressure compressor case 156. The pressurized air may be delivered to the combustor 142 which may be enveloped by a combustor case 158.

The combustor 142 may include one or more fuel injectors 144 which may penetrate the combustor case 158. The fuel injectors 144 may spray fuel into the compressed air to form an air-fuel mixture which may be ignited causing a relatively large increase in pressure and temperature inside the combustor 142. The ignition of the air-fuel mixture may generate superheated air (e.g., combustion gases) which may flow from the combustor 142 into a high-pressure turbine 146 and a low-pressure turbine 148 respectively housed within a high-pressure turbine case 160 and a low-pressure turbine case 162. The turbines 146, 148 may expand the combustion gases inside a turbine exhaust case 164 prior to discharge from the core nozzle 150. The turbines 146, 148 may also rotate the fan rotor 124 to accelerate the remaining portion of the intake air through the fan duct 132 and out of the fan nozzle 134 to add to the engine thrust 172.

Referring still to FIG. 5, in the example shown, the engine strut 200 may extend along the engine case 152 in a direction parallel to a longitudinal axis 120 of the turbine engine 118. The engine strut 200 may at least partially overlap or extend along in non-contacting relation above the combustor case 158. However, the engine strut 200 may also overlap other portions of the engine case 152. For example, the engine strut 200 may overlap the high-pressure combustor case 158 and the low-pressure combustor case 158. In FIG. 5, the forward engine mounts 210 may be coupled to the engine core 136 at the low-pressure compressor case 154. The engine strut 200 may also overlap the high-pressure turbine case 160 and the low-pressure turbine case 162. In the example shown, the aft engine mounts 212 may be coupled to the engine core 136 at the high-pressure turbine case 160. As may be appreciated, the engine strut 200 may extend along any portion of the engine core 136, and may be coupled to the engine core 136 at any one of a variety of locations, and is not limited to the attachment points illustrated in the figures and described herein.

Figure 6:
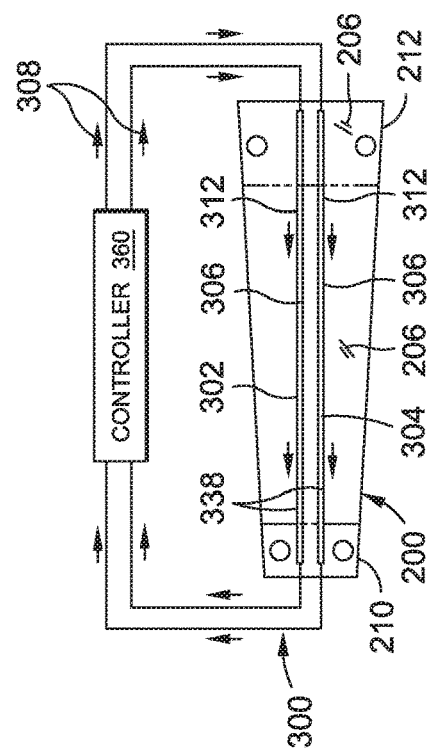
FIG. 6 is a plan view of an underside of the engine strut taken along line 6 of FIG. 5 and illustrating an example of a first monitor and a second monitor mounted to the underside of the engine strut and wherein the first monitor and the second monitor are each configured as an electrical conductor forming an electrical continuity circuit with the controller.

FIG. 6 is a plan view of an underside 206 of an engine strut 200 showing an example of a first monitor 302 and a second monitor 304 mounted to or positioned along the underside 206 of the engine strut 200. Also shown is a diagrammatic representation of a controller 360 to which the first monitor 302 and the second monitor 304 may each be communicatively coupled. The first monitor 302 and/or the second monitor 304 may each have opposing ends coupled to the controller 360 to form a pair of electrical continuity circuits 306. As indicated above, the controller 360 may be an electronic engine controller 360 (e.g., a FADEC 362). In an embodiment, the controller 360 may be configured such that whenever the turbine engine 118 (FIG. 1) is operating, the controller 360 may generate an electrical current for injecting into each one of the electrical continuity circuits 306 (e.g., the first monitor 302 and the second monitor 304). In an embodiment, the system 300 may be configured such that continuity must be confirmed through each of the electrical continuity circuits 306 (e.g., through the first monitor 302 and through the second monitor 304) as a requirement for dispatching the aircraft 100.

As indicated above, in an embodiment, the controller 360 determines whether the first monitor 302 and/or the second monitor 304 have failed and, if both the first monitor 302 and the second monitor 304 have failed, the controller 360 automatically reduces an operating parameter 170 (FIG. 1) of the turbine engine 118 (FIG. 1). In some examples, the controller 360 may correlate a cessation of electrical current flow 308 through the first monitor 302 and/or the second monitor 304 to a break in the electrical continuity of the first monitor 302 and/or second monitor 304 as a result of heating of the first monitor 302 and/or the second monitor 304 by a jet of hot gas (not shown) discharging through the engine case 152 (FIG. 1) as a result of a burn-through at that location. In this regard, a cessation of electrical current flow 308 through the first monitor 302 may correspond to (e.g., may be described as) a failure of the first monitor 302. Likewise, a cessation of electrical current flow 308 through the second monitor 304 may correspond to a failure of the second monitor 304.

As mentioned above, the first monitor 302 and the second monitor 304 may each be configured to individually fail upon reaching a triggering temperature. Reaching the triggering temperature during operation of the turbine engine 118 may be indicative of a burn-through in the engine case 152 (e.g., the combustor case 158). In this regard, the first monitor 302 and the second monitor 304 may provide a means for monitoring for excessive localized heating of the engine strut 200 beyond the normal heating that occurs at that location during nominal engine operation. In one example, the triggering temperature may be no higher than the combustor temperature 174 (FIG. 1) during nominal engine operation at maximum thrust. The triggering temperature may be lower than the melting temperature of the engine strut 200 material (e.g., approximately 2700 F for high-strength steel; approximately 3000 F for titanium Ti-6Al-4V).

Upon determining that both the first monitor 302 and the second monitor 304 have failed, the controller 360 automatically reduces the engine operating parameter 170 (FIG. 1). For example, the controller 360 may reduce engine thrust 172 (FIG. 1). Alternatively or additionally, the controller 360 may effectuate a reduction in combustor pressure 176 (FIG. 1) inside the combustor 142 (FIG. 5). Such a reduction in combustor pressure 176 may be due to a reduction in fuel flow rate into the combustor 142 with a corresponding reduction in engine thrust 172. In another example, the controller 360 may effectuate a reduction in combustor temperature 174 such as by reducing engine thrust 172. In this regard, the controller 360 may be configured to reduce the operating parameter 170 by reducing the T4 rating of the turbine engine 118 which may correspond to the temperature at the combustor exit/turbine entrance (e.g., station T4 of a turbine engine). Advantageously, reducing the operating parameter 170 in relation to the T4 rating may allow the turbine engine 118 to adjust to external conditions such that engine thrust 172 is reduced only to a level necessary to allow the engine strut 200 to retain the necessary load-carrying capability to support the turbine engine 118 during the remaining phases of a flight.

The controller 360 is preferably configured to reduce the operating parameter 170 (e.g., engine thrust 172) such that the turbine engine 118 is not completely shutdown or reduced to idle, but instead is reduced to a non-idle thrust setting allowing the turbine engine 118 to generate a reduced amount of engine thrust 172 while continuing to generate hydraulic pressure, pneumatic power, and/or electrical power to support other aircraft systems. For example, the turbine engine 118 may continue to operate at a non-idle level that generates some amount of hydraulic pressure to support hydraulic actuation of flight control surfaces, and/or allow the turbine engine 118 to continue generating electrical power to support various electrical systems such as avionics. Although the controller 360 may avoid a full shutdown of the turbine engine 118 when triggered by failure of both the first monitor 302 and the second monitor 304, the system 300 may allow for full shutdown of the engine by the flight crew.

The controller 360 may be configured to reduce engine thrust 172 (FIG. 1) via a reduction of the thrust level setting of one or more of the thrust levers (not shown) that may be located on the flight deck 106 (FIG. 2). The engine thrust 172 may be reduced to a non-idle thrust setting such that the temperature of the engine strut 200 is maintained at or below the limiting temperature. In some example, the limiting temperature may be measured by one or more temperature sensors (e.g., thermocouples—not shown) mounted on the engine strut 200 and coupled to the controller 360. The limiting temperature may be based on the material from which the engine strut 200 is formed. For example, the engine thrust 172 may be reduced to a level such that the limiting temperature is the temperature below which an engine strut 200 material retains at least 50 percent of its room temperature strength. In another example, the limiting temperature may be the temperature below which the engine strut 200 material retains at least 70 percent of its yield strength at room temperature.

In some examples, the controller 360 may reduce the operating parameter 170 of the turbine engine 118 only if the second monitor 304 fails within a relatively short time period of failure of the first monitor. For example, the controller 360 may reduce the operating parameter 170 only if the first monitor 302 and the second monitor 304 fail within up to 10 seconds of one another. More preferably, the controller 360 may be configured to reduce the operating parameter 170 only if the first monitor 302 and second monitor 304 fail within one (1) second of one another. Failure of the first monitor 302 within a relatively short time of the failure of the second monitor 304 may avoid a false alarm in the event of failure of only one of the first monitor 302 and second monitor 304 due to reasons other than a burn-through of the engine case 152, such as for example, a loose (e.g., electrical) connection between the controller 360 and one of the monitors 302, 304.

The controller 360 may be configured to reduce the thrust setting of at least the affected engine to a level that results in a reduction of the temperature of the engine strut 200 down to a limiting temperature at which the engine strut 200 is capable of retaining its load-carrying capability. For a multi-engine aircraft 100, the controller 360 may be configured to reduce the thrust setting of at least the affected engine which may be defined as the engine with the failed first monitor 302 and second monitor 304. The controller 360 may optionally be configured to equally reduce the engine thrust 172 of all engines (e.g., both engines of a twin engine aircraft 100) to avoid an asymmetric thrust condition. In some examples, the controller 360 may be configured to physically move the thrust lever(s) on the flight deck 106 to a reduced thrust setting.

Referring briefly to FIG. 1, in some examples, the system 300 may include an indicator 364 (e.g., a warning lamp and/or a warning bell—not shown) which may be communicatively coupled to the controller 360. For situations where the controller 360 determines that only one of the first monitor 302 or the second monitor 304 has failed (and not both), the controller 360 may cause the indicator 364 to generate an indication of the failure. For example, an indicator 364 in the flight deck 106 may alert the flight crew of the failure so that they may more closely monitor the operating characteristics (e.g., combustor temperature 174, combustor pressure 176, exhaust gas temperature, fuel flow rate, etc.) of the turbine engine 118. The indicator 364 may be configured to generate a visual indication such as via a warning light that illuminates or flashes. Such a warning light may be included on the instrument panel and/or glass display or may be placed at another location in the flight deck 106. In other examples, the indicator 364 may present a digital indication with alphanumeric characters indicating the occurrence of a failure and including other information such as the identification of the engine (e.g., left engine or right engine of a twin-engine aircraft 100), the current temperature (T4) and/or pressure of the combustor 142, a time-stamp of the initiation of the failure, and other information.

In still further examples, the indicator 364 may be a speaker configured to provide an aural indication of the failure such as a buzz, a beep, a constant tone, a pre-recorded voice message, or other aural indications. Alternatively or additionally, the indicator 364 may be configured to provide a tactile indication of the failure. For example, the indicator 364 may comprise a vibrating flight crew seat on the flight deck 106 and/or a vibrating control column or control stick. In any of the failure scenarios including a failure of a single one of the monitors 302, 304, or a failure of both monitors 302, 304, such failure may be automatically logged into the aircraft operating history such as in a flight data recorder. Additionally or alternatively, such failure information may be transmitted to a ground-based entity such as an airline maintenance crew so they can prepare to inspect the affected engine once the aircraft 100 arrives at its intended destination or at a later time during a scheduled maintenance check. In the event of a failure of a single one of the monitors 302, 304, the controller 360 may generate the indication of a failure while continuing to operate the turbine engine 118 without reducing an operating parameter 170. In this regard, a single failure of one of the monitors 302, 304 may result in the controller 360 allowing the turbine engine 118 to continue operating with the same engine thrust 172, combustor temperature 174, and/or combustor temperature 174 as prior to the failure.

Referring again to FIG. 6, shown is an example of the first monitor 302 and the second monitor 304 configured as an electrical conductor 312 and located on an underside 206 of an engine strut 200. The opposing ends of each one of the electrical conductors 312 may be communicatively coupled to the controller 360. Each one of the electrical conductors 312 may be formed of a material configured to locally melt or sever when locally heated to the triggering temperature such as by a jet of hot gas in the event of a burn-through of the engine case 152 (FIG. 1). During operation of the turbine engine 118, the controller 360 may be configured to generate an electrical current for injecting into each electrical conductor 312. In some examples, the controller 360 may correlate a cessation of electrical current flow 308 through an electrical conductor 312 to a break in continuity of electrical conductor 312 and which may occur as a result of a severance of the electrical conductor 312 by a jet of hot gas.

In the example shown in FIG. 6, the first monitor 302 and the second monitor 304 may be placed in relatively close proximity to one another to avoid the possibility of a single point failure and the potential for a false alarm resulting in unnecessary reduction of the operating parameter 170 (e.g., engine thrust 172) of the turbine engine 118. In one example, the first monitor 302 and the second monitor 304 may be positioned in non-contacting close proximity to one another at a maximum spacing of less than approximately three (3) inches at any point along a length of the first monitor 302 and the second monitor 304. In a preferable embodiment, the spacing may be less than approximately one (1) inch.

In addition, the first monitor 302 and/or the second monitor 304 may be configured in a straight shape 338. In the example shown, the first monitor 302 and the second monitor 304 may extend along a direction generally parallel to the longitudinal axis 120 of the turbine engine 118. In addition, the first monitor 302 may be oriented in substantially parallel (e.g., ±30 degrees) relation to the second monitor 304. However, the first monitor 302 and the second monitor 304 may be provided in shapes other than a straight shape 338, and may be oriented in any one of a variety of different directions. Although the first monitor 302 and the second monitor 304 preferably have substantially the same configuration, shape, and/or size, (e.g., the same length and/or covering the same region of the engine strut 200 and/or engine case 152), in any of the embodiments disclosed herein, the first monitor 302 may be provided in a different configuration, shape, and/or size than the second monitor 304.

Figure 7:
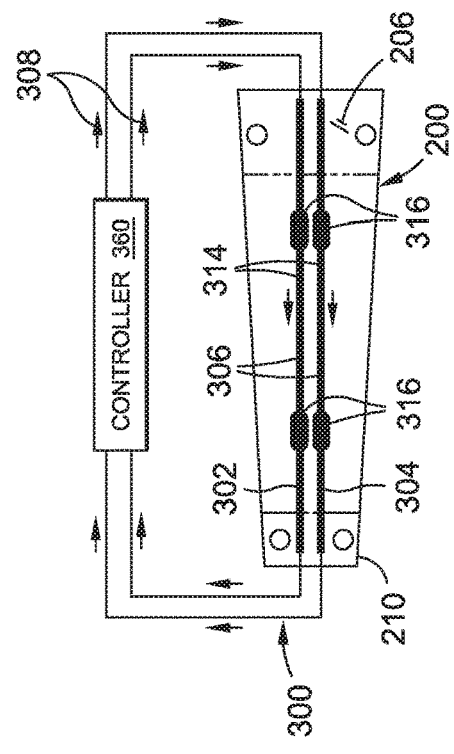
FIG. 7 is an example of the first monitor and the second monitor each configured as a thermal fuse mounted to the underside of the engine strut and wherein each one of the first monitor and second monitor forms an electrical continuity circuit with the controller.

FIG. 7 is an example of the first monitor 302 and the second monitor 304 configured as a thermal fuse 314 mounted to the underside 206 of the engine strut 200. Each thermal fuse 314 forms an electrical continuity circuit 306 with the controller 360 which may generate an electrical current for passing through each thermal fuse 314, as described above. Each thermal fuse 314 may include at least one fusible portion 316 positioned at any location along the length of the thermal fuse 314. In some examples, a thermal fuse 314 may include multiple fusible portions 316 located at spaced intervals along the length of the thermal fuse 314. Similar to the above-described functionality of the electrical conductor 312 embodiment, a fusible portion 316 of the thermal fuse 314 may be configured to melt when locally heated to the triggering temperature. The controller 360 may correlate a cessation of electrical current flow 308 through the thermal fuse 314 to the melting of the fusible portion 316. For embodiments where the first monitor 302 or the second monitor 304 is configured as a thermal fuse 314, such cessation of electrical current flow 308 through the thermal fuse 314 may correspond to (e.g., may be described as) a failure of the monitor 302, 304.

Figure 8:
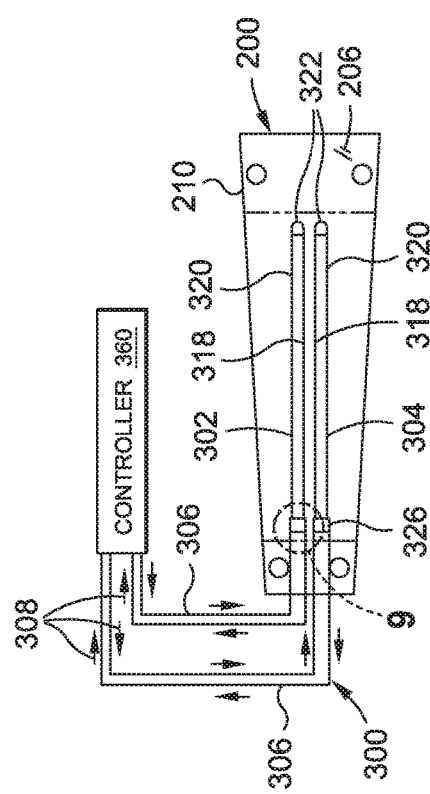
FIG. 8 is an example of the first monitor and the second monitor each configured as a gas-filled sensor tube having a pressure switch communicatively coupled to the controller.

FIG. 8 is an example of the first monitor 302 and the second monitor 304 each configured as a gas-filled sensor tube 318. Each sensor tube 318 may include a sealed housing 320 containing an inert gas 322 such as helium. In some examples, the sensor tube 318 may include a metal hydride core 324 configured to evolve hydrogen gas when heated to the triggering temperature. The sensor tube 318 may be operatively coupled to a pressure switch 326 which, in the example shown, may be located on one of opposing ends of the sensor tube 318.

Figure 9:
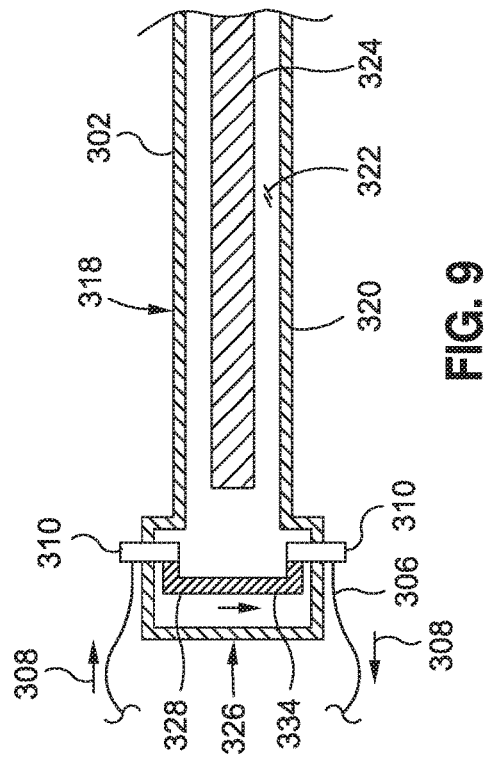
FIG. 9 is a magnified view of an end portion of the sensor tube and illustrating an example of a pressure switch in a normally closed position.
Figure 10:
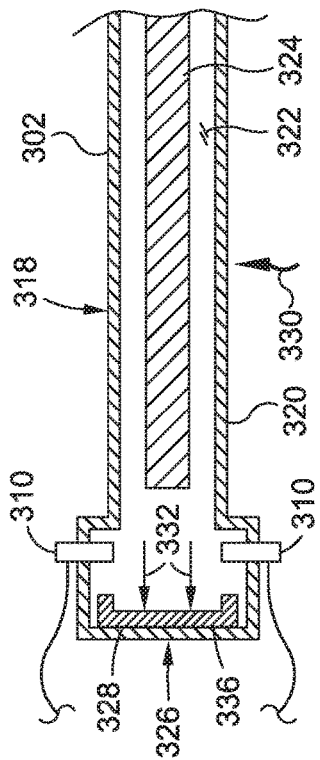
FIG. 10 is a magnified view of the pressure switch of FIG. 9 in a pneumatically-actuated open position as a result of an increase in internal pressure due to heating of the sensor tube to the triggering temperature.

Referring to FIGS. 9-10, shown is an end portion of the sensor tube 318 illustrating an example of the pressure switch 326. FIG. 9 shows the pressure switch 326 in a normally closed position 334. The pressure switch 326 may include electrical terminals 310 which may be coupled to the controller 360. In addition, the pressure switch 326 may include an internal sliding bridge 328. In the example of FIG. 9, the sliding bridge 328 is in a closed position 334 interconnecting the electrical terminals 310 and thereby forming an electrical continuity circuit 306 such that electrical current 308 injected by the controller 360 may flow between the electrical terminals 310 on opposite sides of the pressure switch 326.

Referring to FIG. 10, shown is the pressure switch 326 of FIG. 9 in a pneumatically-actuated open position 336. When the housing 320 is heated to the triggering temperature such as by a jet of hot gas (not shown) during a burn-through event, the gas 322 (e.g., helium and evolving hydrogen gas) sealed within the housing 320 may increase the internal pressure 332 within the sensor tube 318. The increase in internal pressure 332 may result in pneumatic actuation of the pressure switch 326 wherein the sliding bridge 328 moves from the closed position 334 in FIG. 9 to the open position 336 in FIG. 10. Actuation of the pressure switch 326 to the open position 336 may break the electrical continuity with the controller 360 halting electrical current flow 308 across the pressure switch 326. The controller 360 may detect actuation of the pressure switch 326 from the closed position 334 to the open position 336 resulting from cessation of electrical current flow 308 to the controller 360 and corresponding to a failure of the first monitor 302 and the second monitor 304.

FIGS. 11-12 show a further example of a pressure switch. FIG. 11 shows the pressure switch in a normally open position 336 wherein the sliding bridge 328 is spaced away from the electrical terminals 310 due to internal pressure of the gas 322 sealed within the housing 320. The pressure switch 326 may include one or more springs 329 which may be compressed by the internal pressure of the gas 322. The internal pressure of the gas 322 may force the bridge 328 away from the electrical terminals 310 and thereby prevent the flow of electrical current (not shown) between the electrical terminals 310 on opposite sides of the pressure switch 326 in the open position 336.

FIG. 12 shows the pressure switch 326 of FIG. 11 in a closed position 334 as a result of a loss of internal pressure of the gas 322 within the housing 320. The loss of internal pressure of the gas 322 allows the spring 329 to bias the bridge 328 into contact with the electrical terminals 310 on opposite sides of the pressure switch 326. The loss of internal pressure of the gas 322 may be due to the escape of the gas 322 through one or more openings 333 that may be burned into the housing 320 by one or more jets of hot gas 331 emanating from the engine case (not shown) during a burn-through event of the turbine engine (not shown). For example, a jet of hot gas 331 may locally heat the housing 320 to the triggering temperature which may be the melting temperature of the housing material, and causing an opening 333 to form in the housing 320 through which the gas 322 may escape. Advantageously, the example of the pressure switch 326 of FIGS. 11-12 may avoid the need to configure the housing 320 to be resistant to melt-through by a jet of hot gas.

As may be appreciated, the pressure switch 326 may be provided in any one of a variety of different configurations, and is not limited to the configurations shown in FIGS. 9-12. In addition, the sensor tube 318 may be provided without a metal hydride core 324, and instead may rely on expansion of the inert gas 322 to pneumatically actuate the pressure switch 326.

FIG. 13 is a plan view of a further example of the presently-disclosed system 300 including a pair of first and second monitors 302, 304, the ends of which may each be communicatively coupled to a controller 360 (not shown) as described above. In the example shown, each pair of first and second monitors 302, 304 are positioned in close proximity to one another and are oriented parallel to one another. The pairs are located on opposite sides of a longitudinal centerline (not shown) of the underside 206 of the engine strut 200. In this regard, each pair of first and second monitors 302, 304 may be positioned to detect a burn-through event on the respective sides of the underside 206 of the engine strut 200. Although the first and second monitors 302, 304 are each shown having a straight shape 338 oriented parallel to one another, the monitors 302, 304 may be provided in any one a variety of different shapes and configurations.

FIG. 14 is an example of the first monitor 302 and the second monitor 304 each configured in a serpentine shape 340. The serpentine shape 340 may increase the area along the underside 206 of the engine strut 200 for detecting a localized burn-through event. The opposing ends of each of the first and second monitors 302, 304 may be communicatively coupled to a controller 360 (not shown) in the manner described above. In addition, at least a portion of the first monitor 302 and the second monitor 304 may overlap the forward engine mount 210 and/or the aft engine mount 212 of the engine strut 200 to facilitate detection of a burn-through proximate the load-sensitive engine mounts 210, 212. In this regard, the engine mounts 210, 212 may be configured to provide space for mounting the monitors 302, 304 between the mounts 210, 212 and the engine case 152.

FIG. 15 is an example of the first monitor 302 and the second monitor 304 each configured as a loop 350 and nested with one another. As indicated above, the opposing ends of each one of the loops 350 may be communicatively coupled to a controller 360 (not shown) to form a pair of electrical continuity circuits 306. FIG. 15 shows the loops 350 mounted to the underside 206 of the engine strut 200 and extending between the forward engine mount 210 and the aft engine mount 212. FIG. 16 is an example of the first monitor 302 and the second monitor 304 configured as nested loops 350 and overlapping the forward engine mount 210 and the aft engine mount 212 of the underside 206 of the engine strut 200. As may be appreciated, in any of the examples disclosed herein, the first monitor 302 and the second monitor 304 may be provided in any one of a variety of different sizes, shapes, and configurations, without limitation. Furthermore, although the figures illustrate a single first monitor 302 and a single second monitor 304 positioned in close proximity to one another, the system 300 may include one or more pairs of monitors 302, 304 (e.g., FIG. 15) mounted at different locations on the engine strut 200 and/or mounted at different locations on the engine case 152, as described in greater detail below.

Figure 17:
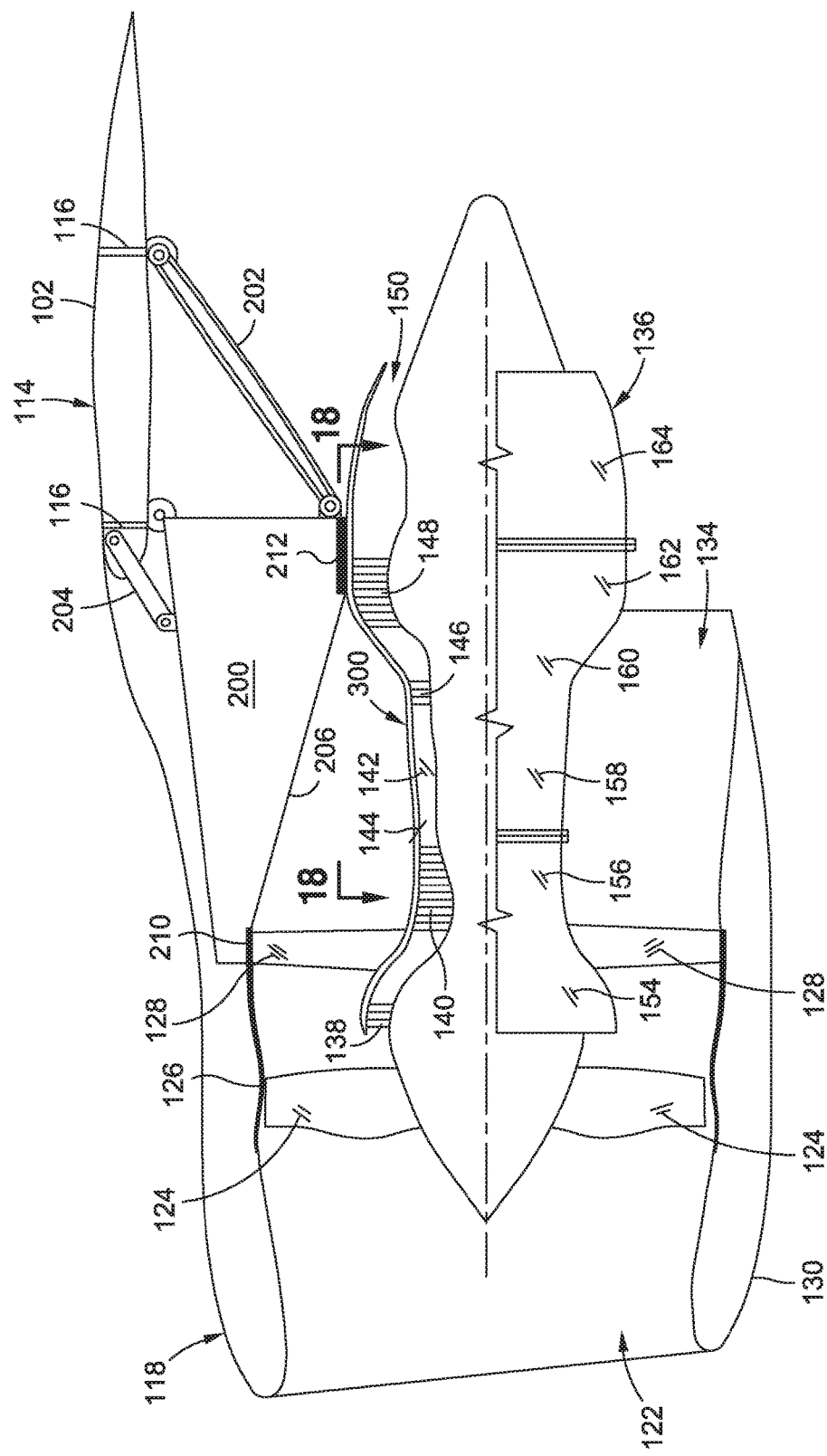
FIG. 17 is a sectional view of a turbine engine illustrating the engine strut attached to a fan case at a forward end of the engine strut and attached to the engine case at an aft end of the engine strut.

FIG. 17 is a sectional view of a turbine engine 118 illustrating the forward engine mount 210 of the engine strut 200 attached to the fan case 126. As indicated above, the fan case 126 may surround the fan rotor 124. The aft engine mount 212 of the engine strut 200 is shown attached to the engine case 152 similar to the arrangement shown in FIG. 5. The arrangement shown in FIG. 17 results in the forward portion of the underside 206 of the engine strut 200 being spaced at a greater distance from the engine case 152 than the arrangement shown in FIG. 5. It should be noted that the engine strut configurations shown in FIGS. 5 and 15 are representative of two of a wide variety of different sizes, shapes, and configurations of engine struts 200 for which the presently-disclosed system 300 may be implemented.

FIG. 18 is a plan view of the upper surface of the engine core 136 of FIG. 17 and illustrating an example of first and second monitors 302, 304 mounted to the engine case 152. In the example shown, each one of the first and second monitors 302, 304 has a straight shape 338 and is mounted in close, parallel relation to one another. The opposing ends of each one of the first and second monitors 302, 304 may be communicatively coupled to a controller 360 (not shown) to form electrical continuity circuits 306, as described above. Preferably, at least a portion of the first and second monitor 302, 304 extends along the combustor case 158 of the engine core 136.

FIG. 19 shows an example of the first monitor 302 and the second monitor 304 configured in a serpentine shape 340 similar to the above-described arrangement in FIG. 14. In any of the examples shown herein, the first monitor 302 and second monitor 304 may extend over any portion of the engine case 152, and are not limited to the arrangement shown in figures. For example, the first and second monitor 302, 304 may each overlap the combustor case 158 as well as a least a portion of the high-pressure compressor case 156 and/or at a least a portion of the high-pressure turbine case 160.

FIG. 20 is a plan view of an example of the first monitor 302 and the second monitor 304 each configured as a loop 350 and mounted to the exterior of the engine case 152. As indicated above, multiple monitor loops 350 may be mounted on the engine case 152 for monitoring and detecting the occurrence of a burn-through event. Even further, different configurations of the first monitor 302 and the second monitor 304 may be combined on the same surface. For example, although not shown in FIG. 20, a first and second monitor 302, 304 in a straight shape 338 may be positioned in the center of the nested loops 350 of the first and second monitor 302, 304.

FIG. 21 is a sectional view of the engine core 136 and engine strut 200 showing an example of the positioning of the first monitor 302 and second monitor 304 directly below the underside 206 of the engine strut 200. As indicated above, in any of the examples disclosed herein, the first monitor 302 and/or the second monitor 304 may be mounted on the engine strut 200 preferably facing toward the combustor case 158. As shown in FIG. 6-16, any number of monitor pairs (e.g., a first monitor 302 and a second monitor 304) may be mounted on any location of the engine strut 200, and preferably on the underside 206 of the engine strut 200 facing the engine case 152. Additionally or alternatively, any number of monitor pairs may be mounted at any location on the engine case 152 and preferably proximate the combustor case 158 at locations that face toward and/or are located proximate the engine strut 200.

Figure 22:
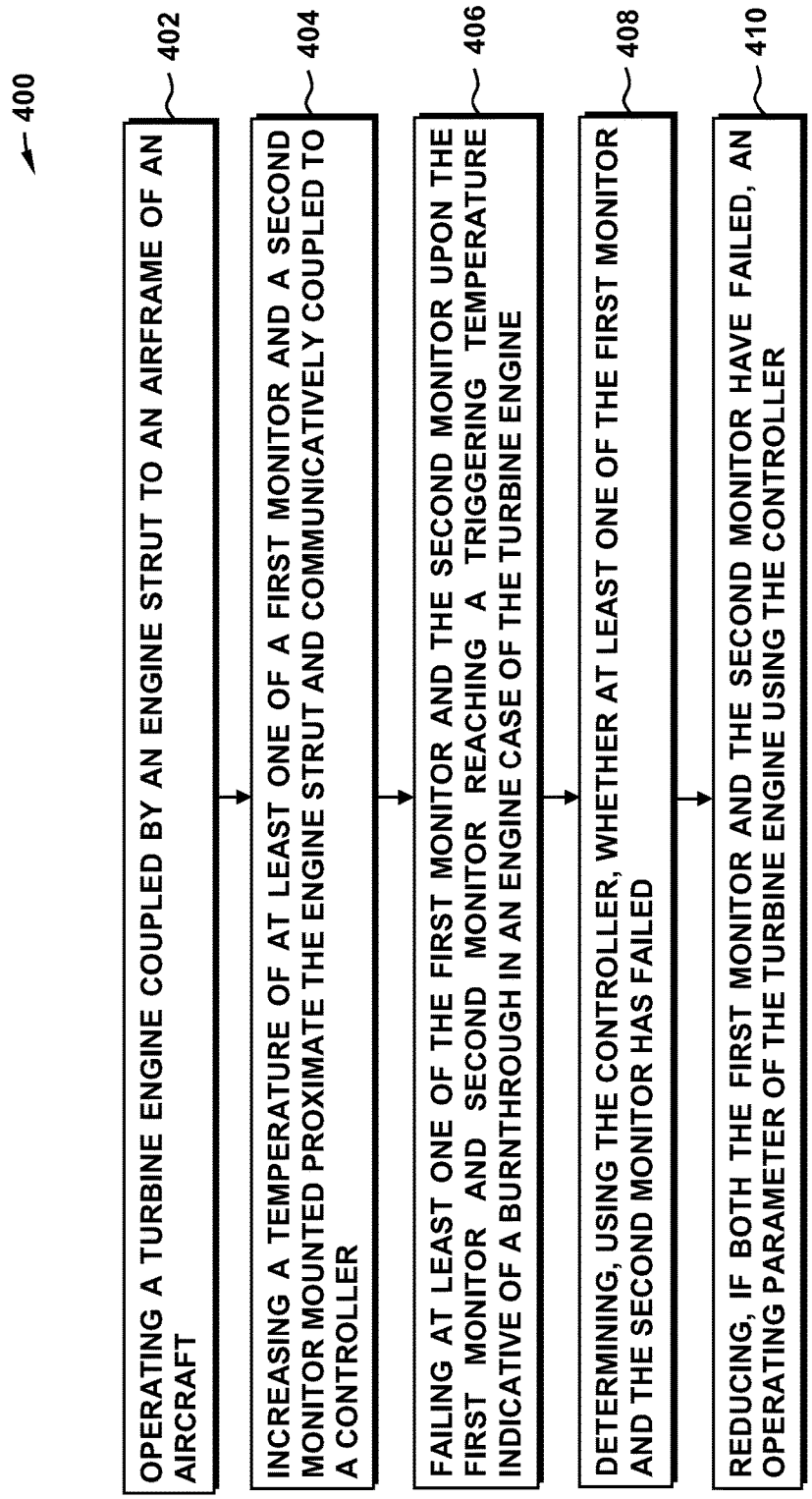
FIG. 22 is a flowchart having one or more operations that may be included in a method of protecting the structural integrity of an engine strut.

FIG. 22 is a flowchart having one or more operations that may be included in a method 400 of protecting the structural integrity of an engine strut 200 such as in the event of a burn-through of the engine case 152. Step 402 of the method 400 may include operating the turbine engine 118. As indicated above, atmospheric air drawn into the intake 122 may be compressed by one or more compressors prior to passing into the combustor 142 as shown in FIG. 5. Fuel may be injected or sprayed into the compressed air and ignited which may cause a significant increase in the pressure and temperature inside the combustor 142. The resulting superheated combustion gases may be passed into the turbines where the combustion gases may expand prior to discharge from the core nozzle 150.

Step 404 of the method 400 may include increasing the temperature of the first monitor 302 and/or the second monitor 304 as may occur in the event of a burn-through in the engine case 152 during operation of the turbine engine 118. As indicated above, a burn-through may occur in the combustor case 158 due to the relatively high pressures and temperatures in the combustor 142. However, a burn-through may also occur at other locations in the engine case 152 such as downstream from the combustor 142. For example, a burn-through may occur at the entrance to the high-pressure turbine case 160 due to the relatively high temperature of the combustion gas entering the turbine portion of the engine core 136.

Step 406 of the method 400 may include failing the first monitor 302 and/or the second monitor 304 in response to the respective first monitor 302 and second monitor 304 reaching a triggering temperature. As mentioned above, the first monitor 302 and the second monitor 304 may be configured to fail when heated to a triggering temperature beyond the normal temperature to which the engine strut 200 may be subjected during nominal (e.g., non-burn-through) operation of the turbine engine 118. In one example, the triggering temperature may be lower than the melting temperature of the engine strut 200 material, and higher than the above-described limiting temperature.

Step 408 of the method 400 may include determining, using the controller 360, whether the first monitor 302 and/or the second monitor 304 has failed. As mentioned above, in an embodiment, the first monitor 302 and/or the second monitor 304 may each be provided as an electrical continuity circuit 306 into which the controller 360 may continuously inject electrical current 308 whenever the turbine engine 118 is operating. In such embodiment, the step of determining whether the electrical continuity circuit 306 has failed may include correlating a cessation of current flow 308 through the electrical continuity circuit 306 to a break in the electrical continuity circuit 306, and which may correspond to (e.g., may be described as) failure of the first monitor 302 and/or failure of the second monitor 304). As mentioned above, failure of the electrical continuity circuit 306 may be due to a burn-through of the engine case 152 which may result in severing the electrical continuity circuit 306, thereby disrupting electrical current flow 308.

For embodiments where the electrical continuity circuit 306 is an electrical conductor 312 (FIG. 6), the step of determining whether the first monitor 302 and/or the second monitor 304 has failed may include correlating, using the controller 360, the cessation of current flow 308 through the electrical conductor 312. The cessation of current flow 308 through the electrical conductor 312 may be the result of a severing of the electrical conductor 312 by a jet of hot gas emanating from a burn-through in the engine case 152. The jet of hot gas may locally heat the electrical conductor 312 to or above the triggering temperature causing local melting and severance of the electrical conductor 312. In this regard, the cessation of current flow 308 through the electrical conductor 312 may correspond to failure of the first monitor 302 or the second monitor 304 as represented by the electrical conductor 312.

For embodiments where the electrical continuity circuit 306 is a thermal fuse 314 having at least one fusible portion 316 (FIG. 7), the step of determining whether the first monitor 302 and/or the second monitor 304 has failed may include correlating, using the controller 360, the cessation of current flow 308 through the thermal fuse 314 to the melting of the fusible portion 316. The fusible portion 316 may be melted by a jet of hot gas emanating from the engine case 152. As mentioned above, the melting of the fusible portion 316 may correspond to the failure of the first monitor 302 or the second monitor 304 as represented by the thermal fuse 314.

For embodiments where the electrical continuity circuit 306 is a gas-filled sensor tube 318 (e.g., FIGS. 8-10) having a pressure switch 326 as described above, the step of determining whether the first monitor 302 and/or the second monitor 304 has failed may include detecting, using the controller 360, pneumatic actuation of the pressure switch 326 which may be caused by an increase in internal pressure 332 of the gas 322 in the sensor tube 318. As mentioned above, the increase in internal pressure 332 within the sensor tube 318 may be caused by the application of heat 330 due to a burn-through in the engine case 152. Actuation of the pressure switch 326 from a closed position 334 (FIG. 9) to an open position 336 (FIG. 10) may break the electrical continuity circuit 306 between the pressure switch 326 and the controller 360. The resulting cessation of electrical current flow 308 may correspond to failure of the first monitor 302 or the second monitor 304 as represented by the sensor tube 318.

In another embodiment shown in FIGS. 11-12, actuation of the pressure switch 326 may be caused by a reduction or loss of internal pressure of the gas 322 within the sensor tube 318. The reduction or loss of internal pressure 322 within the sensor tube 318 may be the result of an opening 333 forming in one or more location of the housing 320. Such opening 333 may be melted into the housing by a jet of hot gas 331 (FIG. 12) allowing the inert gas 322 to escape from the housing 320 and resulting in the spring 329 biasing the sliding bridge 328 from a normally open position 336 (FIG. 11) to a closed position 334 (FIG. 12) and interconnecting the terminals 310 on opposing sides of the pressure switch 326. The interconnection of the terminals 310 by the bridge 328 may allow for the flow of electrical current 308 across the pressure switch 326, thereby forming a closed electrical continuity circuit 306 that may be detected by the controller 360. In response, the controller 360 may reduce an operating parameter 170 of the turbine engine 118.

In some examples of the method 400, Step 408 of determining whether the first monitor 302 and/or the second monitor 304 has failed may include determining, using the controller 360, that only one of the first monitor 302 and the second monitor 304 has failed. In such a scenario, the method may include causing, using the controller 360, an indicator 364 (FIG. 1) to generate an indication of the failure of either the first monitor 302 or the second monitor 304. The controller 360 may cause the indicator 364 to generate an indication as a means to alert the flight crew so that they make more closely monitor the operation of the affected engine. The controller 360 may allow the turbine engine 118 to continue operation without reducing an operating parameter 170 such as the engine thrust 172.

The step of causing the indicator 364 to indicate failure of the first monitor 302 and the second monitor 304 may include generating a visual indication, an aural indication, and/or a tactile indication of the failure such as for the flight crew. In this regard, the indication may be generated in the flight deck 106 of the aircraft 100 by means of a warning light, a warning sound, and/or a warning vibration such as of the flight crew seat, the control column, or another object in the flight deck 106. The method may additionally include recording the occurrence of the failure in the flight data recorder and/or transmitting the occurrence of the failure to the ground-based entity such as an airline maintenance crew, as mentioned above.

Step 410 of the method 400 may include reducing, if both the first monitor 302 and the second monitor 304 have failed, an operating parameter 170 of the turbine engine 118 using the controller 360. As mentioned above, the controller 360 may be configured to reduce the operating parameter 170 only if the second monitor 304 fails within a predetermined or relatively short time of the failure of the first monitor 302. For example, the controller may reduce the operating parameter 170 only if the second monitor 304 fails within one (1) second of the first monitor 302. Such an arrangement may avoid a false alarm that may otherwise occur as a result of the perceived failure of one of the monitors 302, 304 by a non-burn-through event, such as a loose connection between the controller 360 and one of the monitors 302, 304, causing a cessation of electrical current flow 308 through the monitor 302, 304, followed by a failure of the remaining monitor at a later time (e.g., greater than 1 second) due to a burn-through.

In the event that both the first monitor 302 and the second monitor 304 have failed, the method may include reducing the engine thrust 172 to a non-idle thrust setting. For example, the engine thrust 172 may be reduced to a level such that the temperature of the engine strut 200 (e.g., the portion of the engine strut 200 nearest the engine case 152) is reduced below or at a limiting temperature at which the engine strut 200 material retains a certain percentage of its room temperature strength. In an embodiment, the controller 360 may automatically reduce the engine thrust 172 to a level such that the temperature of the engine strut 200 is reduced below a temperature at which the strength of the engine strut 200 material is at least 70 percent of its room temperature yield strength. In this regard, the engine thrust 172 may be limited to the point necessary to preserve the load-carrying capability of the engine strut 200 during the remainder of the flight. As an alternative to or in addition to reducing the engine thrust 172, the step of reducing the operating parameter 170 may include reducing the combustor pressure 176 and/or reducing combustor temperature 174 to a level such that the engine strut 200 is reduced to a temperature below or at the limiting temperature.

Additional modifications and improvements of the present disclosure may be apparent to those of ordinary skill in the art. Thus, the particular combination of parts described and illustrated herein is intended to represent only certain embodiments of the present disclosure and is not intended to serve as limitations of alternative embodiments or devices within the spirit and scope of the disclosure.

What is claimed is:

1. A system for protecting the structural integrity of an engine strut, comprising:
    a first monitor mounted proximate the engine strut coupling a turbine engine to an airframe of an aircraft;
    a second monitor mounted proximate the first monitor, the first monitor and the second monitor each configured to fail upon reaching a triggering temperature indicative of a burn-through in an engine case during operation of the turbine engine; and
    a controller communicatively coupled to the first monitor and the second monitor, the controller configured to automatically reduce an engine thrust of the turbine engine to a non-idle thrust setting at which the turbine engine generates a reduced amount of engine thrust while continuing to generate hydraulic pressure, pneumatic power, and/or electrical power upon a failure of both the first monitor and the second monitor.

2. The system of claim 1, wherein:
    the controller is configured to reduce the engine thrust of the turbine engine only if the second monitor fails within a predetermined time of the first monitor.

3. The system of claim 1, further including:
    an indicator communicatively coupled to the controller; and
    the controller configured to determine whether only one of the first monitor and the second monitor has failed and, if only one of the first monitor and the second monitor has failed, the controller configured to cause the indicator to generate an indication of a failure of only one of the first monitor and the second monitor.

4. The system of claim 1, wherein:
at least one of the first monitor and the second monitor comprises an electrical continuity circuit having opposing ends coupled to the controller;
the controller configured to continuously pass an electrical current through the electrical continuity circuit; and
the controller correlating a cessation of electrical current flow through the electrical continuity circuit to a break in the electrical continuity circuit corresponding to failure of at least one of the first monitor and the second monitor.

5. The system of claim 4, wherein:
the electrical continuity circuit comprises one of an electrical conductor and a thermal fuse.

6. The system of claim 4, wherein:
at least one of the first monitor and the second monitor comprises a sensor tube having a housing containing a gas and operatively coupled to a pressure switch communicatively coupled to the controller; and
the controller configured to detect actuation of the pressure switch during heating of one of at least one of the housing and the gas to the triggering temperature, the actuation of the pressure switch corresponding to a failure of at least one of the first monitor and the second monitor.

7. The system of claim 1, wherein at least one of the first monitor and the second monitor is mounted on one of:
an underside of the engine strut; and
a combustor case of the turbine engine.

8. The system of claim 1, wherein:
the turbine engine is coupled by the engine strut to one of a wing and a fuselage.

9. A system for protecting the structural integrity of an engine strut, comprising:
a first monitor mounted proximate the engine strut coupling a turbine engine to a wing of an aircraft;
a second monitor mounted proximate the first monitor, the first monitor and the second monitor each configured to fail upon reaching a triggering temperature indicative of a burn-through in a combustor case during operation of the turbine engine; and
a controller communicatively coupled to the first monitor and the second monitor, the controller configured to automatically reduce an engine thrust of the turbine engine to a non-idle thrust setting at which the turbine engine continues to generate hydraulic pressure, pneumatic power, and/or electrical power upon a failure of both the first monitor and the second monitor.

10. A method for protecting the structural integrity of an engine strut, comprising:
operating a turbine engine coupled by the engine strut to an airframe of an aircraft;
increasing a temperature of at least one of a first monitor and a second monitor mounted proximate the engine strut and communicatively coupled to a controller;
failing at least one of the first monitor and the second monitor upon reaching a triggering temperature indicative of a burn-through in an engine case of the turbine engine;
determining, using the controller, whether at least one of the first monitor and the second monitor has failed; and
reducing, using the controller if both the first monitor and the second monitor have failed, an engine thrust of the turbine engine to a non-idle thrust setting at which the turbine engine generates a reduced amount of engine thrust while continuing to generate hydraulic pressure, pneumatic power, and/or electrical power.

11. The method of claim 10, wherein the step of reducing the engine thrust includes:
reducing the engine thrust only if the second monitor fails within 1 second of the first monitor.

12. The method of claim 10, wherein the step of determining whether at least one of the first monitor and the second monitor has failed comprises:
determining, using the controller, that only one of the first monitor and the second monitor has failed; and
causing, using the controller, an indicator to generate an indication of failure of only one of the first monitor and the second monitor.

13. The method of claim 12, wherein the step of causing the indicator to generate the indication of failure of only one of the first monitor and the second monitor comprises:
generating at least one of a visual indication, an aural indication, and a tactile indication.

14. The method of claim 10, wherein at least one of the first monitor and the second monitor comprises an electrical continuity circuit communicatively coupled to the controller, the step of determining whether at least one of the first monitor and the second monitor has failed comprising:
correlating, using the controller, a cessation of current flow through the electrical continuity circuit to a break in the electrical continuity circuit corresponding to failure of at least one of the first monitor and the second monitor.

15. The method of claim 14, wherein:
the electrical continuity circuit comprises one of an electrical conductor and a thermal fuse.

16. The method of claim 10, wherein at least one of the first monitor and the second monitor comprises a gas-filled sensor tube operatively coupled to a pressure switch communicatively coupled to the controller, the step of determining whether at least one of the first monitor and the second monitor has failed comprising:
detecting, using the controller, actuation of the pressure switch in response to heating of the sensor tube to the triggering temperature and corresponding to failure of at least one of the first monitor and the second monitor.

* * * * *